(12) United States Patent
Fukuda et al.

(10) Patent No.: US 7,547,263 B2
(45) Date of Patent: Jun. 16, 2009

(54) APPARATUS FOR ADJUSTING A POSITION OF A BICYCLE CONTROL DEVICE

(75) Inventors: Masahiko Fukuda, Amagasaki (JP); Kazuhiro Fujii, Kawachinagano (JP); Ryuichiro Takamoto, Sakai (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 849 days.

(21) Appl. No.: 10/907,135

(22) Filed: Mar. 22, 2005

(65) Prior Publication Data

US 2005/0215369 A1    Sep. 29, 2005

(30) Foreign Application Priority Data

Mar. 29, 2004    (JP)    .............................. 2004-094532

(51) Int. Cl.
- F16H 61/00    (2006.01)
- B62M 9/12    (2006.01)
- G06G 7/00    (2006.01)

(52) U.S. Cl. .............................. 474/70; 474/80; 474/82; 474/69; 280/260; 701/55; 701/57

(58) Field of Classification Search ............. 474/69–71, 474/78, 80–82; 280/238, 259–260; 482/8–9, 482/63, 900–902; 180/205–207; 701/51–57
See application file for complete search history.

(56) References Cited

U.S. PATENT DOCUMENTS

| | | | |
|---|---|---|---|
| 4,490,127 A * | 12/1984 | Matsumoto et al. ........... 701/64 |
| 4,786,049 A * | 11/1988 | Lautenschlager ............ 482/63 |
| 5,059,158 A | 10/1991 | Bellio et al. |
| 5,213,548 A | 5/1993 | Colbert et al. |
| 5,356,348 A * | 10/1994 | Bellio et al. ................... 474/70 |
| 5,357,177 A | 10/1994 | Fey et al. |
| 5,483,137 A | 1/1996 | Fey et al. |
| 5,569,104 A | 10/1996 | Bellio et al. |
| 5,577,969 A * | 11/1996 | Watarai ........................ 474/78 |
| 5,599,244 A * | 2/1997 | Ethington ..................... 474/70 |
| 5,681,234 A | 10/1997 | Ethington |
| 5,865,454 A * | 2/1999 | Campagnolo ................ 280/238 |
| 6,047,230 A * | 4/2000 | Spencer et al. ................ 701/57 |
| 6,367,833 B1 * | 4/2002 | Horiuchi ...................... 280/260 |
| 6,467,786 B2 * | 10/2002 | Horiuchi ....................... 474/69 |
| 6,988,739 B2 * | 1/2006 | Guderzo et al. ............... 474/70 |
| 7,373,232 B2 * | 5/2008 | Guderzo ....................... 701/51 |
| 2004/0108680 A1 | 6/2004 | Guderzo et al. |

OTHER PUBLICATIONS

European search report for EP 05006795.8, the European application that corresponds to this application, dated May 30, 2008.

* cited by examiner

Primary Examiner—Marcus Charles
(74) Attorney, Agent, or Firm—James A. Deland

(57) ABSTRACT

An apparatus for adjusting a position of a bicycle control device comprises a memory that stores a plurality of operating position values corresponding to a plurality of operating positions, a manually operated adjustment value providing unit that provides an adjustment value, and an updating unit. The updating unit provides a first updated operating position value from a first operating position value from the plurality of operating position values based on the adjustment value, and the updating unit provides a second updated operating position value from a different second operating position value from the plurality of operating position values based on the adjustment value.

28 Claims, 14 Drawing Sheets

APPARATUS FOR ADJUSTING A POSITION OF A BICYCLE CONTROL DEVICE

BACKGROUND OF THE INVENTION

The present invention is directed to bicycles and, more particularly, to an apparatus for adjusting a position of a bicycle control device.

Some modern bicycles have various electrical control devices used to control the bicycle transmission, the bicycle suspension, and so on. An example of an electrical control device used to control front and rear bicycle derailleurs is shown in U.S. Pat. No. 5,059,158. The control device shown in that reference controls the front and rear derailleurs using an automatic gear shift mode, a manual gear shift mode, and a calibration mode. When the control device is in the automatic gear shift mode, the cadence (i.e., crank RPM) is determined from the bicycle speed and the gear ratio, and the front and rear derailleurs are controlled by moving each derailleur to a desired sprocket position so that the cadence will fall within a preset range. When the control device is in the manual gear shift mode, an upshift or downshift alert signal is displayed if the cadence falls outside a preset range. The rider then may manually command the control device to perform an appropriate upshift or downshift using an electrical switch.

The calibration mode is used when the control unit is first set up, such as when the bicycle is manufactured, in order to record the proper derailleur position for each sprocket. The calibration mode also is used to fine-tune the derailleur position when the actual derailleur position for a particular sprocket deviates from the proper position. For example, the actual derailleur position may become offset from the desired position due to stretching of the gear shift cable, the shape of the frame, or the derailleur mounting method. In calibration mode, the sprocket position for a derailleur can be adjusted in the upshift and downshift directions by operating corresponding upshift and downshift switches on the handlebar. Unfortunately, such a conventional derailleur control device requires the derailleur position to be calibrated separately for each sprocket. Thus, the calibration procedure can be cumbersome, particularly with a rear derailleur that operates with a large number of sprockets.

SUMMARY OF THE INVENTION

The present invention is directed to an apparatus for adjusting a position of a bicycle control device. In one embodiment, an apparatus for adjusting a position of a bicycle control device comprises a memory that stores a plurality of operating position values corresponding to a plurality of operating positions, a manually operated adjustment value providing unit that provides an adjustment value, and an updating unit. The updating unit provides a first updated operating position value from a first operating position value from the plurality of operating position values based on the adjustment value, and the updating unit provides a second updated operating position value from a different second operating position value from the plurality of operating position values based on the adjustment value. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
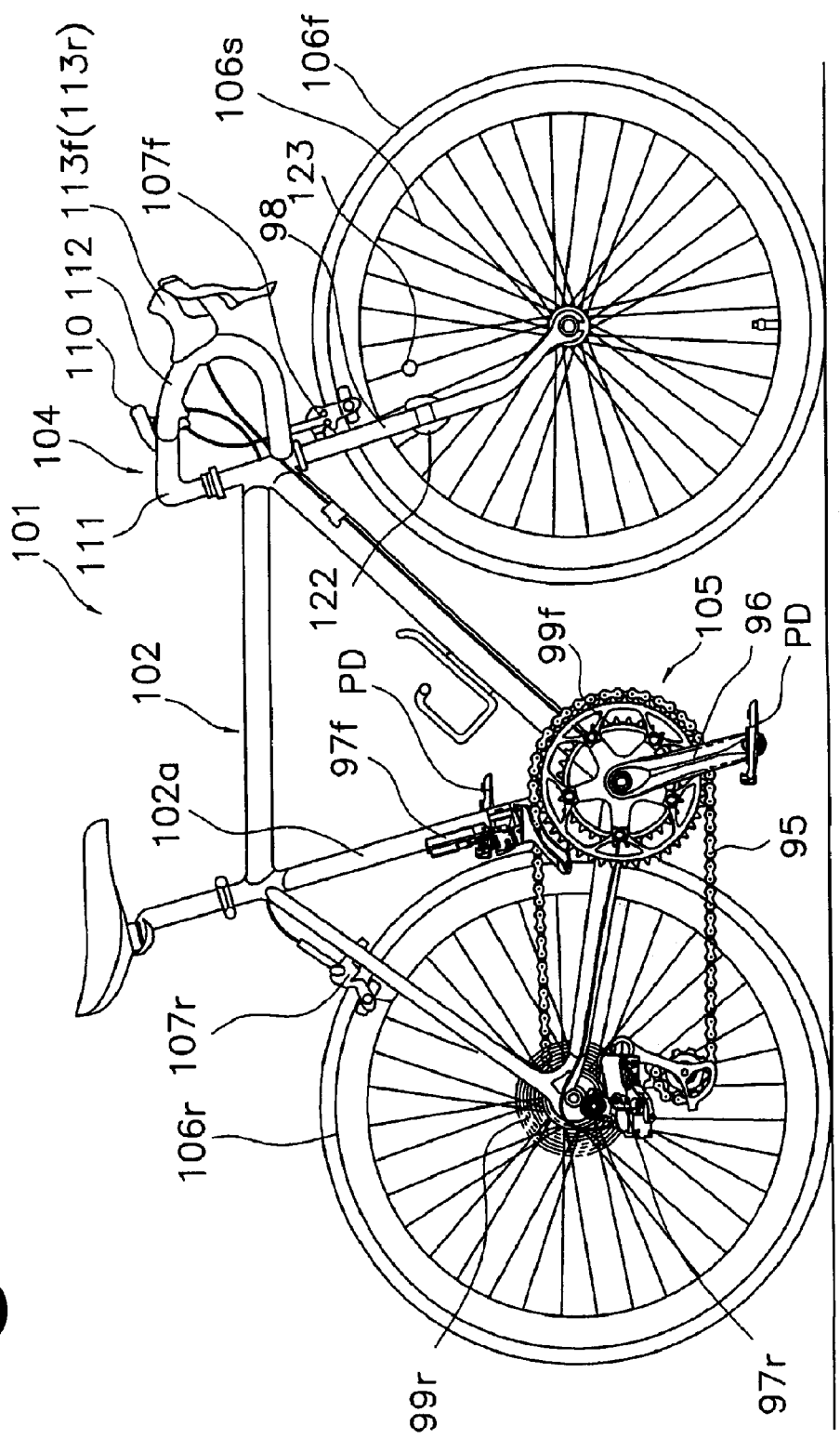
FIG. 1 is a side view of a particular embodiment of a bicycle.

FIG. 1 is a side view of a bicycle 101 that includes particular embodiments of electrically controlled components. Bicycle 101 is a road bicycle comprising a diamond-shaped frame 102, a front fork 98 rotatably mounted to frame 102, a handlebar assembly 104 mounted to the upper part of fork 98, a front wheel 106f rotatably attached to the lower part of fork 98, a rear wheel 106r rotatably attached to the rear of frame 102, and a drive unit 105. A front wheel brake 107f is provided for braking front wheel 106f, and a rear wheel brake 107r is provided for braking rear wheel 106r.

Figure 5:
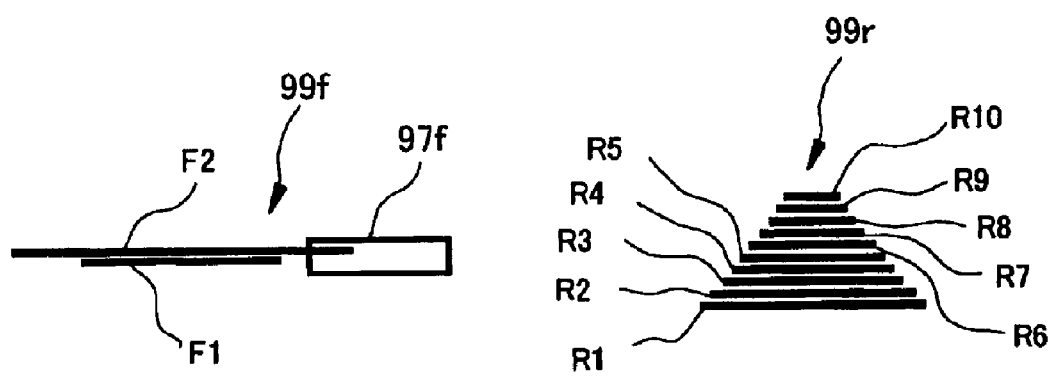
FIG. 5 is a schematic diagram of the front and rear sprocket assemblies.

Drive unit 105 comprises a chain 95, a front sprocket assembly 99f coaxially mounted with a crank 96 having pedals PD, an electrically controlled front derailleur 97f attached to a seat tube 102a of frame 102, a rear sprocket assembly 99r coaxially mounted with rear wheel 106r, and an electrically controlled rear derailleur 97r. As shown in FIG. 5, front sprocket assembly 99f comprises two coaxially mounted sprockets F1-F2, and rear sprocket assembly 99r comprises ten sprockets R1-R10 mounted coaxially with an axle 145 (FIG. 7) of rear wheel 106r. The number of teeth on front sprocket F1 is less than the number of teeth on front sprocket F2. The numbers of teeth on rear sprockets R1-R10 gradually decrease from rear sprocket R1 to rear sprocket R10. As a result, rear sprocket R1 has the greatest number of teeth, and rear sprocket R10 has the least number of teeth. Front derailleur 97f moves to two operating positions to switch chain 95 between front sprockets F1 and F2, and rear derailleur 97r moves to ten operating positions to switch chain 95 among selected ones of the rear sprockets R1-R10. A front gear position sensor 133f (FIG. 6) senses the operating position of front derailleur 97f, and a rear gear position sensor 133r senses the operating position of rear derailleur 97r. A battery or some other power source (not shown) powers front and rear derailleurs 97f and 97r as well as other electrical components described herein in a known manner.

Figure 7:
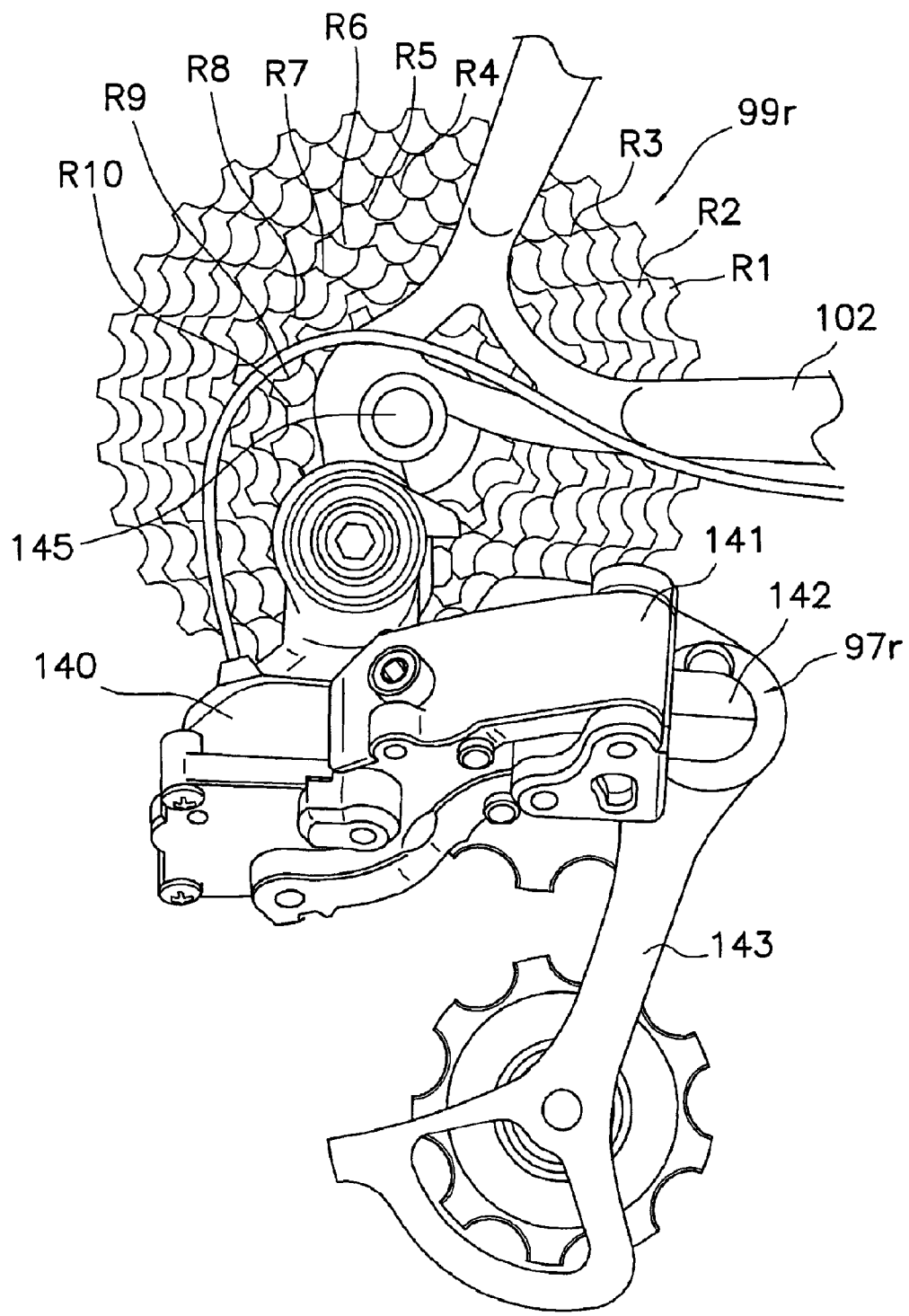
FIG. 7 is a detailed view of a particular embodiment of a rear derailleur.

As shown in FIG. 7, rear derailleur 99r comprises a base member 140 that houses a gear shift motor and deceleration mechanism, a link mechanism 141 pivotably connected to base member 140, and a movable member 142 pivotably mounted to link mechanism 141 so that movable member 142 moves laterally relative to base member 140 in accordance with the operation of the motor housed within base member 140. Movable member 142 pivotably supports a chain guide 143 so that lateral movement of movable member 142 switches chain 95 among rear sprockets R1-R10.

Figure 2:
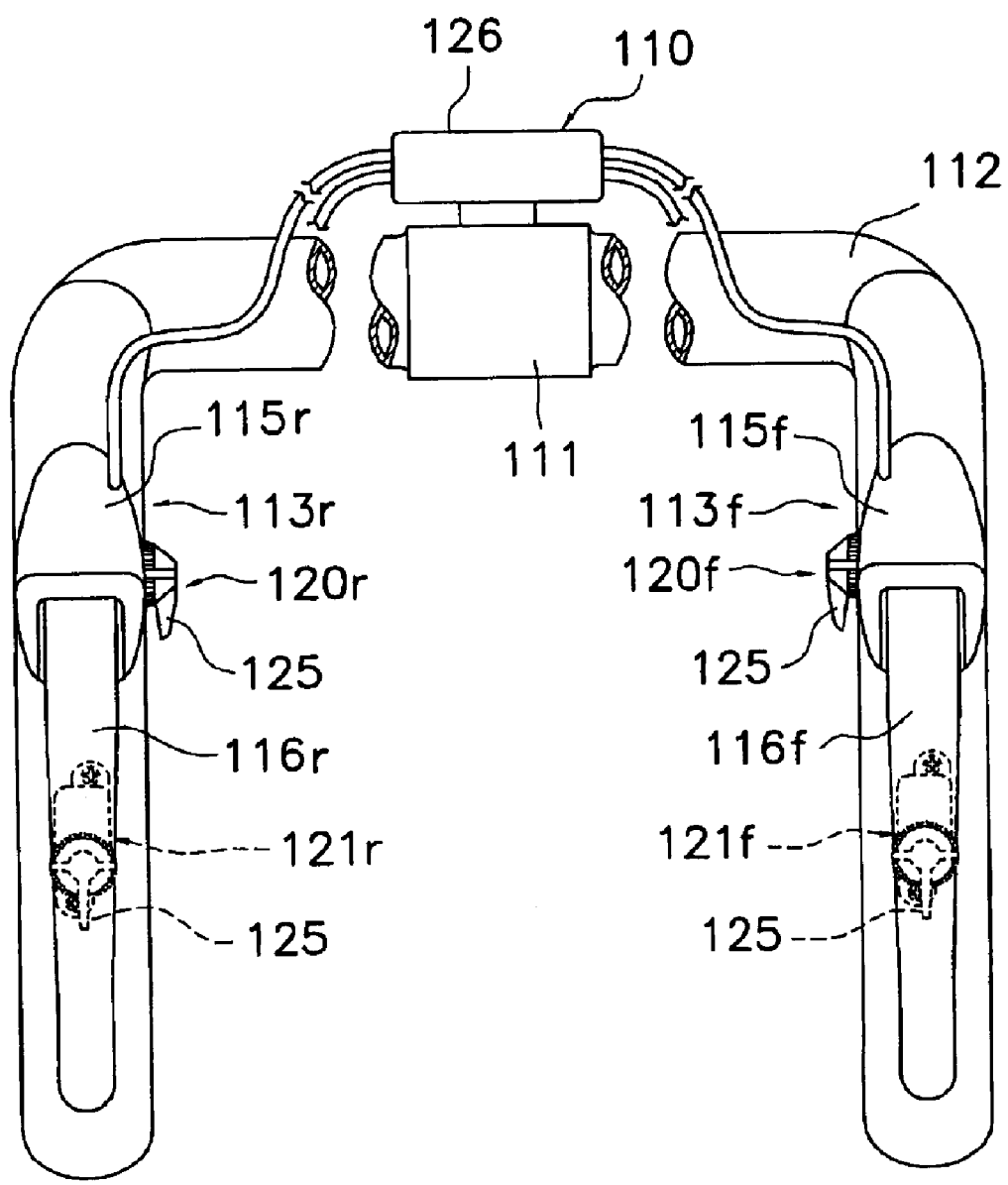
FIG. 2 is a front view of particular embodiments of brake lever assemblies mounted to the bicycle handlebar.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. As shown in FIG. 2, brake lever assemblies 113f and 113r are mounted at opposite sides of handlebar 112. Brake lever assembly 113f controls the operation of front wheel brake 107f, and brake lever assembly 113r controls the operation of rear wheel brake 107r. A derailleur control device 110 is mounted to a central portion of handlebar 112.

Figure 3:
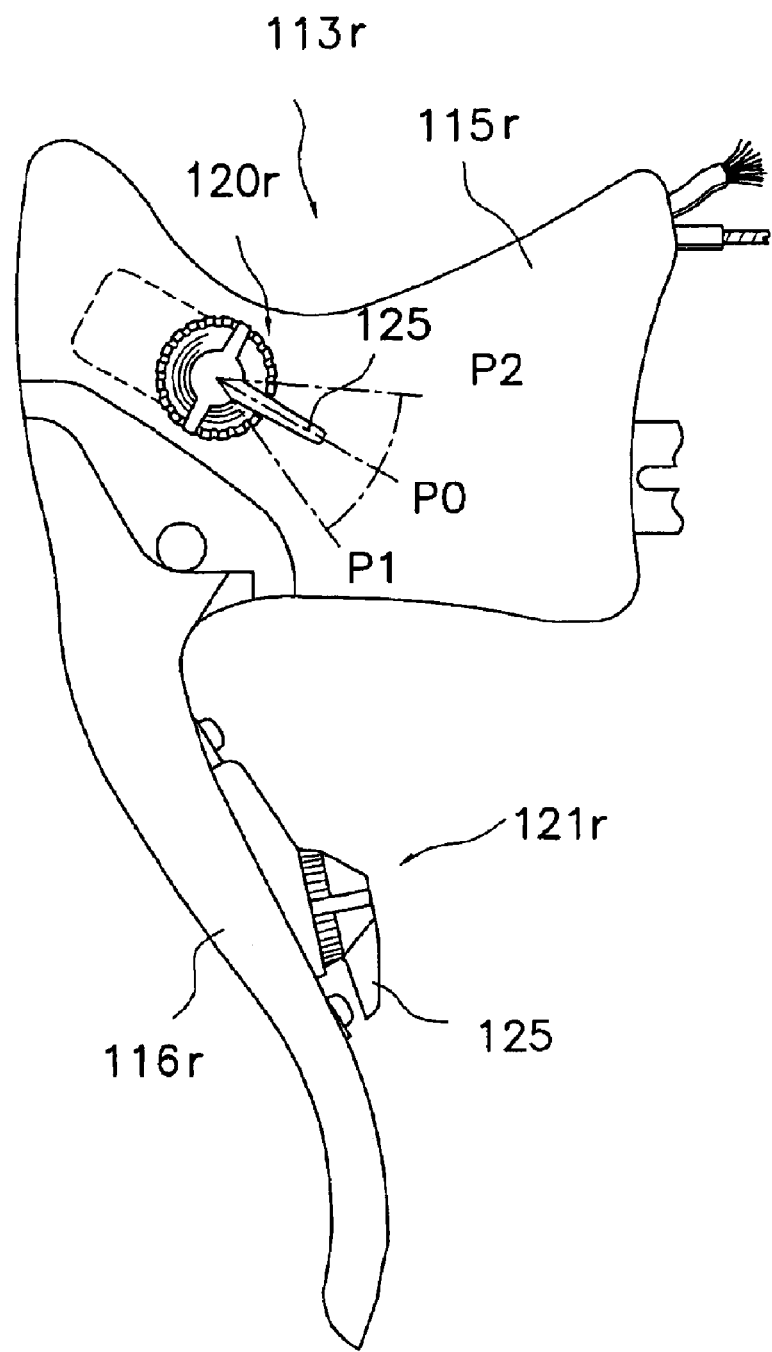
FIG. 3 is a side view of the rear brake lever assembly.
Figure 4:
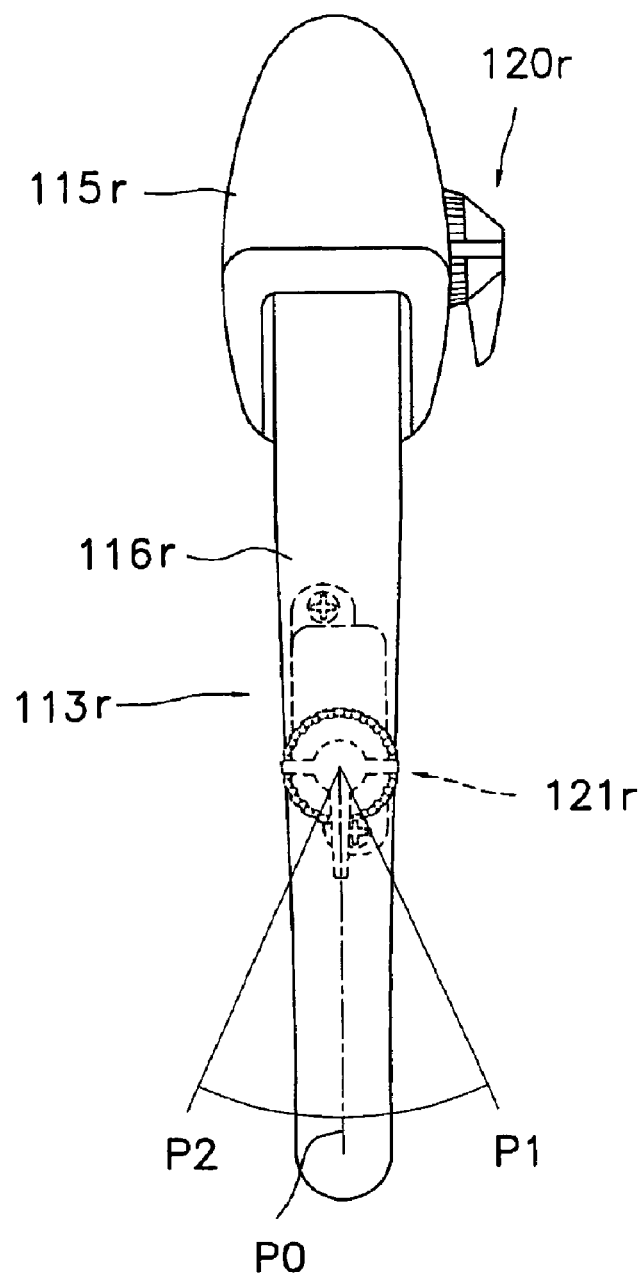
FIG. 4 is a front view of the rear brake lever assembly.

Brake lever assemblies 113f and 113r comprise respective brake brackets 115f and 115r mounted to the forward curved portions of handlebar 112, and brake levers 116f and 116r pivotably mounted to brake brackets 115f and 115r. Rear shift control devices 120r and 121r with switch levers 125 are mounted to the inner side of brake bracket 115r and to the rear side of brake lever 116r, respectively, to control the operation of rear derailleur 97r. In this embodiment, rear shift control devices 120r and 121r independently control the operation of rear derailleur 97r so that the rider may control the operation of rear derailleur 97r with the hand grasping brake bracket 115r or with the hand grasping brake lever 116r. As shown in FIG. 3, the switch lever 125 mounted to brake lever bracket 115r rotates downward from a home position P0 to a first position P1 and rotates upward from home position P0 to a second position P2 to control the operation of rear derailleur 97r. As shown in FIG. 4, the switch lever 125 mounted to the rear of brake lever 116r rotates laterally inward from a home position P0 to a first position P1 and rotates laterally outward from home position P0 to a second position P2 to control the operation of rear derailleur 97r. Similarly, independent front shift control devices 120f and 121f with switch levers 125 are mounted to the inner side of brake bracket 115f and to the rear side of brake lever 116f, respectively, to control the operation of front derailleur 97f. The switch levers 125 mounted to brake lever bracket 115f and brake lever 116f operate in the same manner as switch levers 125 mounted to brake lever bracket 115r and brake lever 116r. All of the switch levers 125 are biased toward the home position P0.

A front upshift switch 131f (FIG. 6) and a front downshift switch 132f are mounted in each front shift control device 120f and 121f. The front upshift switches 131f operate when switch levers 125 in front shift control devices 120f and 121f rotate from position P0 to position P1, and the front downshift switches 132f operate when switch levers 125 in front shift control devices 120f and 121f rotate from position P0 to position P2. Similarly, a rear upshift switch 131r and a rear downshift switch 132r are mounted in each rear shift control device 120r and 121r. The rear upshift switches 131r operate when switch levers 125 in rear shift control devices 120r and 121r rotate from position P0 to position P1, and the rear downshift switches 132r operate when switch levers 125 in rear shift control devices 120r and 121r rotate from position P0 to position P2. Of course, many different switch combinations that operate in many different ways may be provided to suit different applications.

Figure 6:
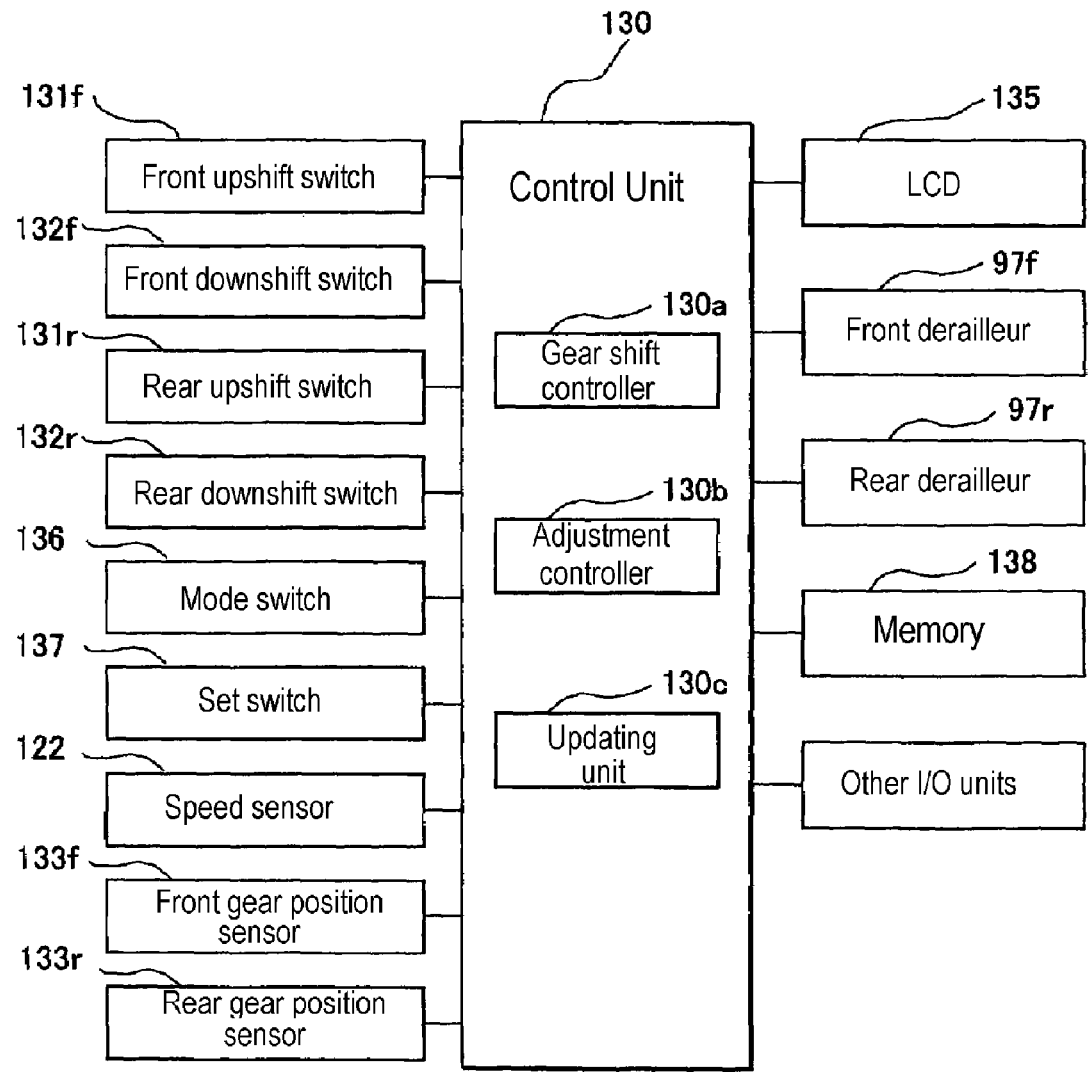
FIG. 6 is a schematic block diagram of a particular embodiment of a derailleur control apparatus.
Figure 8:
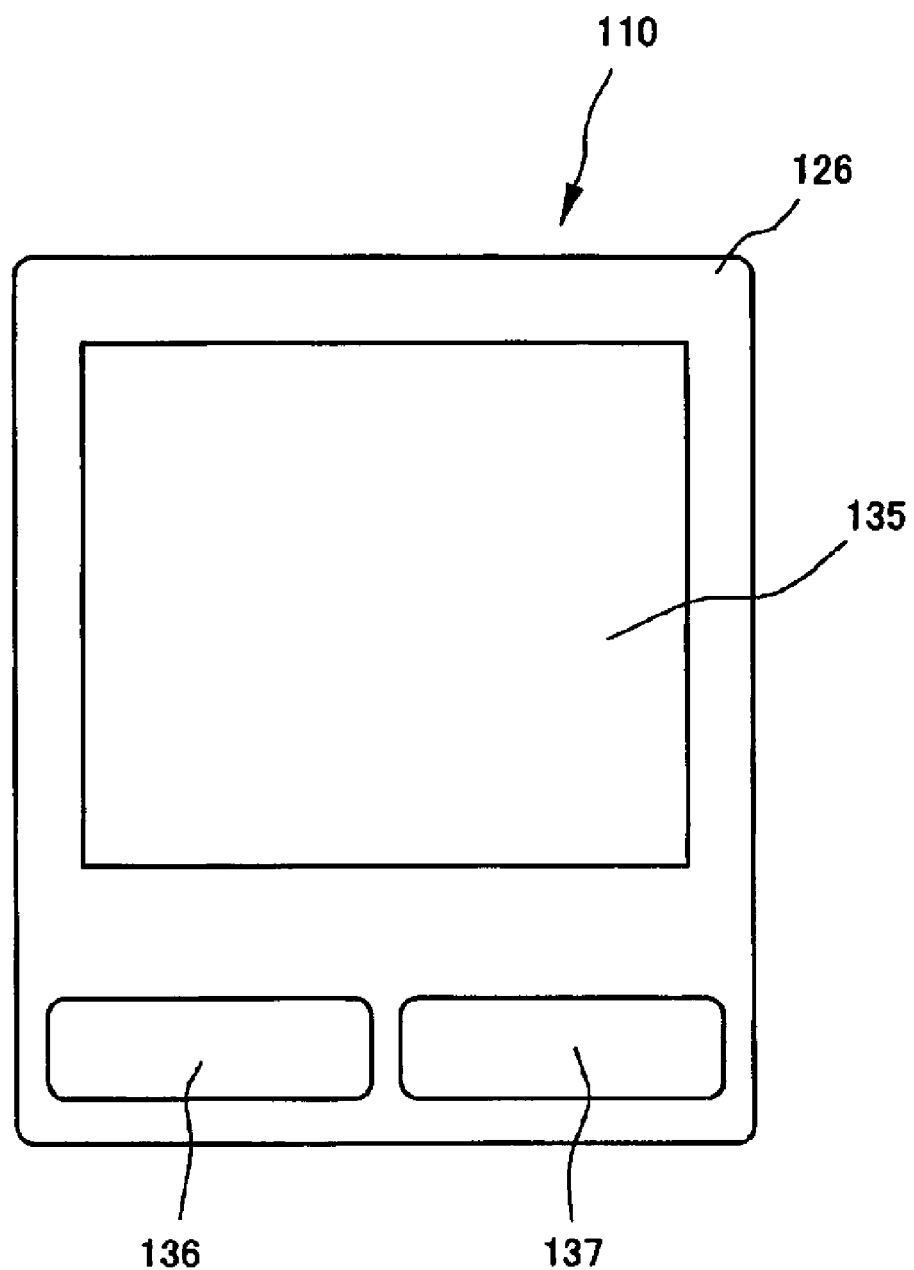
FIG. 8 is a plan view of a gear shift controller housing.

As shown in FIGS. 2, 6 and 8, derailleur control device 110 comprises a case 126 mounted onto the central portion of handlebar 112. Mounted within case 126 are a control unit 130, a liquid crystal display (LCD) 135 for displaying riding parameters and other information, a mode switch 136 and a set switch 137. Front derailleur 97f, rear derailleur 97r, front upshift switch 131f, front downshift switch 132f, rear upshift switch 131r, rear downshift switch 132r, front gear position sensor 133f, rear gear position sensor 133r and other I/O units are connected to control unit 130 through appropriate methods such as wired or wireless devices. A storage unit such as a memory 138 stores various parameters used in the operation of control unit 130. For example, the operating (sprocket) positions (FP, RP) based on the front sprockets FS (S=1, 2) and rear sprockets RS (S=1-10) for the front and rear derailleurs 97f and 97r are stored in accordance with values detected by gear position sensors 133f and 133r. As shown in FIGS. 1 and 6, a speed sensor 122 is mounted to fork 98 to sense the passage of a magnet 123 mounted to a spoke 106s of front wheel 106s and to provide speed indicating signals to control unit 130.

In this embodiment, control unit 130 comprises a programmed microprocessor. Control unit 130 includes a gear shift controller 130a, an adjustment controller 130b and an updating unit 130c. Gear shift controller 130a controls the operation of front derailleur 97f and rear derailleur 97r in a normal mode of operation such as a gear shift mode of operation (for example) to shift chain 95 the distance from an origin sprocket to a destination sprocket in accordance with signals received from front and rear upshift switches 131f and 131r, front and rear downshift switches 132f and 132r, and front and rear gear position sensors 133f and 133r. Adjustment controller 130b adjusts the positions of front derailleur 97f and rear derailleur 97r in an adjustment mode of operation to fine tune the stored operating positions of front derailleur 97f and rear derailleur 97r whenever the actual operating positions of the derailleurs vary from their proper operating positions, for example, or for some other reason. Updating unit 130c may be used to adjust all of the stored operating positions of front derailleur 97f and rear derailleur 97r based on the adjustment of the operating position of one sprocket. Of course, updating may be based on more than one sprocket, depending upon the application. Control unit 130 also displays speed, gear positions, and running distance on LCD 135 based on signals received from speed sensor 122 and gear position sensors 133f and 133r.

Mode switch 136 is used to select the gear shift and adjustment modes of operation of control unit 130. Mode switch 136 also is used to alternate among the various display modes available to LCD 135. Set switch 137 is used to enter the mode selected by mode switch 136. Set switch 137 also is used to indicate the fact that adjustment has been completed in the adjustment mode.

Figure 9:
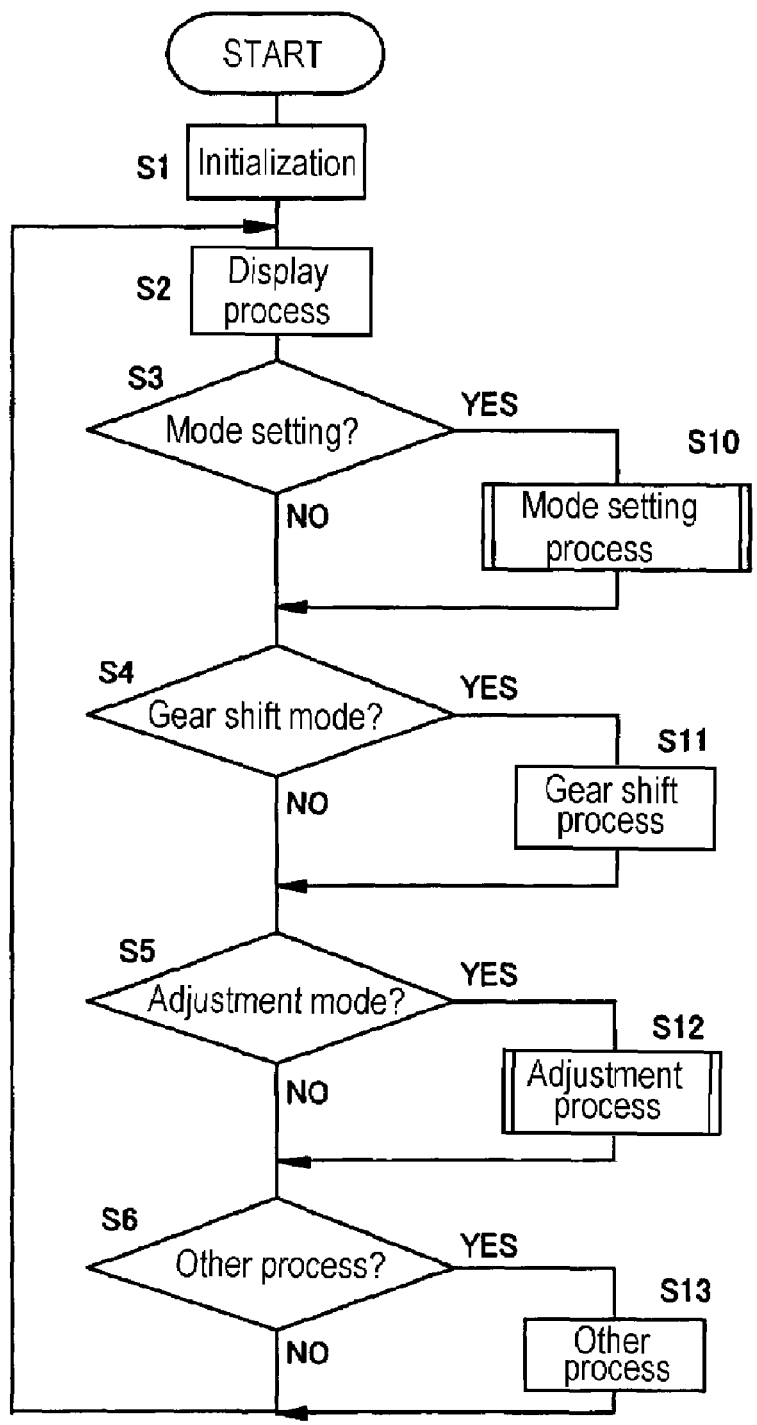
FIG. 9 is a flow chart of a particular embodiment of the operation of the derailleur control apparatus.
Figure 10:
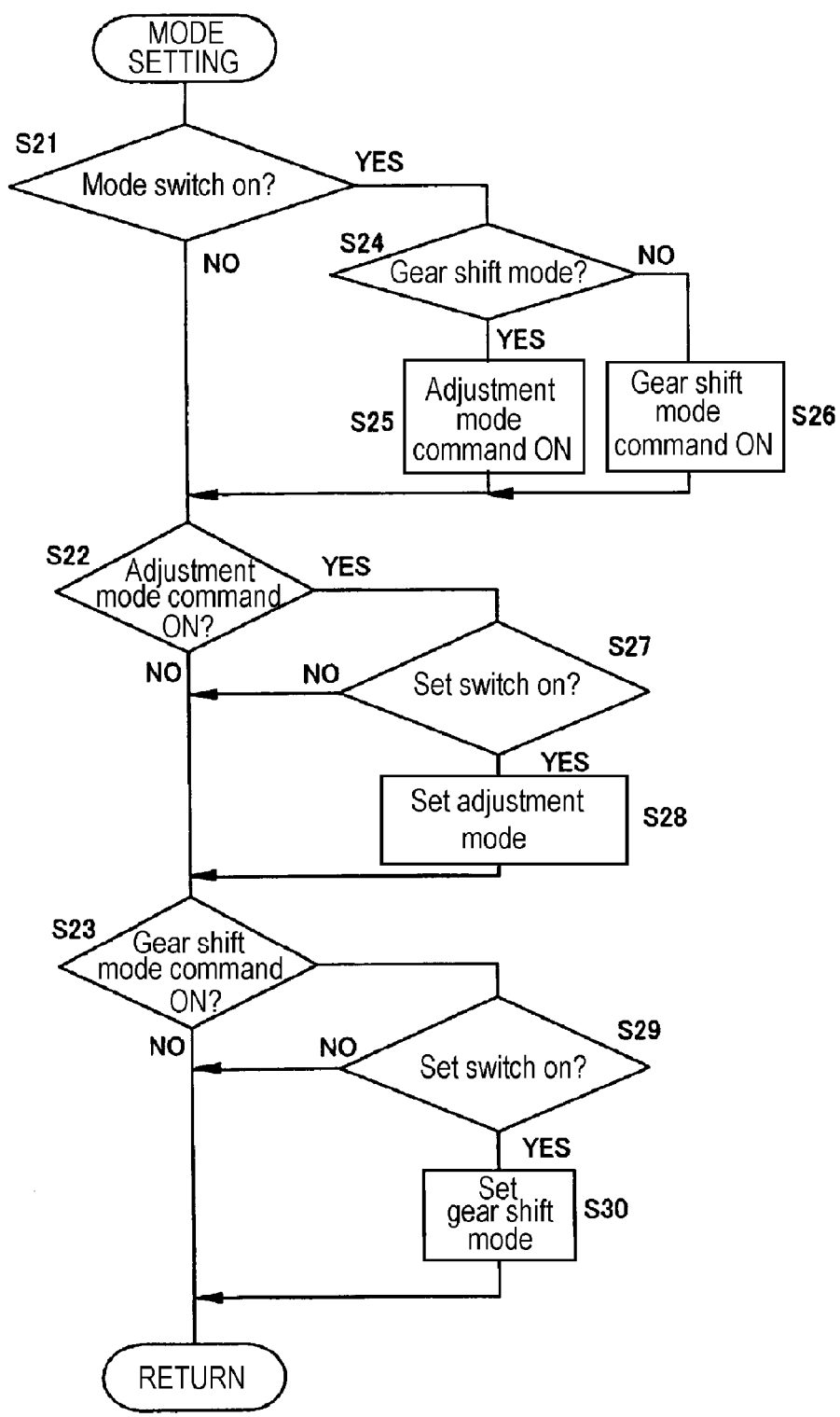
FIG. 10 is a flow chart of a particular embodiment of a mode setting process.

FIG. 9 is a flow chart of a particular embodiment of the operation of control unit 130. Initialization is carried out in a step S1 when power is supplied to control unit 130. In this step, various flags and variables are reset and operating positions (FP, RP) are set to predetermined values and stored in memory 138. In addition, the control mode is set by default to gear shift mode. In step S2, display processing is performed. In this step, the speed and distance ridden are displayed on LCD 135 based on signals from speed sensor 133, and the sprocket positions of front and rear derailleurs 97f and 97r are displayed based on the output from front and rear gear position sensors 133f and 133r. The sprocket positions are displayed in both gear shift and adjustment modes. It is then determined in a step S3 whether or not a mode setting process is requested, typically by the operation of mode switch 136 and set switch 137. If so, then a mode setting process shown in FIG. 10 is performed in a step S10. In any event, it is then determined in a step S4 whether or not gear shift mode is set. If so, then a conventional gear shift process is performed in a step S11.

In the gear shift process of step S11, front derailleur 97f upshifts when a front upshift switch 131f is turned on as a result of a switch lever 125 in front shift control device 120f or 121f rotating from position P0 to position P1, and front derailleur 97f downshifts when a front downshift switch 132f is turned on as a result of a switch lever 125 in front shift control device 120f or 121f rotating from position P0 to position P2. Similarly, rear derailleur 97r upshifts in single increments (i.e., one sprocket position at a time) when a rear upshift switch 131r is turned on as a result of a switch lever 125 in rear shift control device 120r or 121r rotating from position P0 to position P1, and rear derailleur 97r downshifts in single increments when a rear downshift switch 132r is turned on as a result of a switch lever 125 in rear shift control device 120r or 121r rotating from position P0 to position P2.

Figure 11:
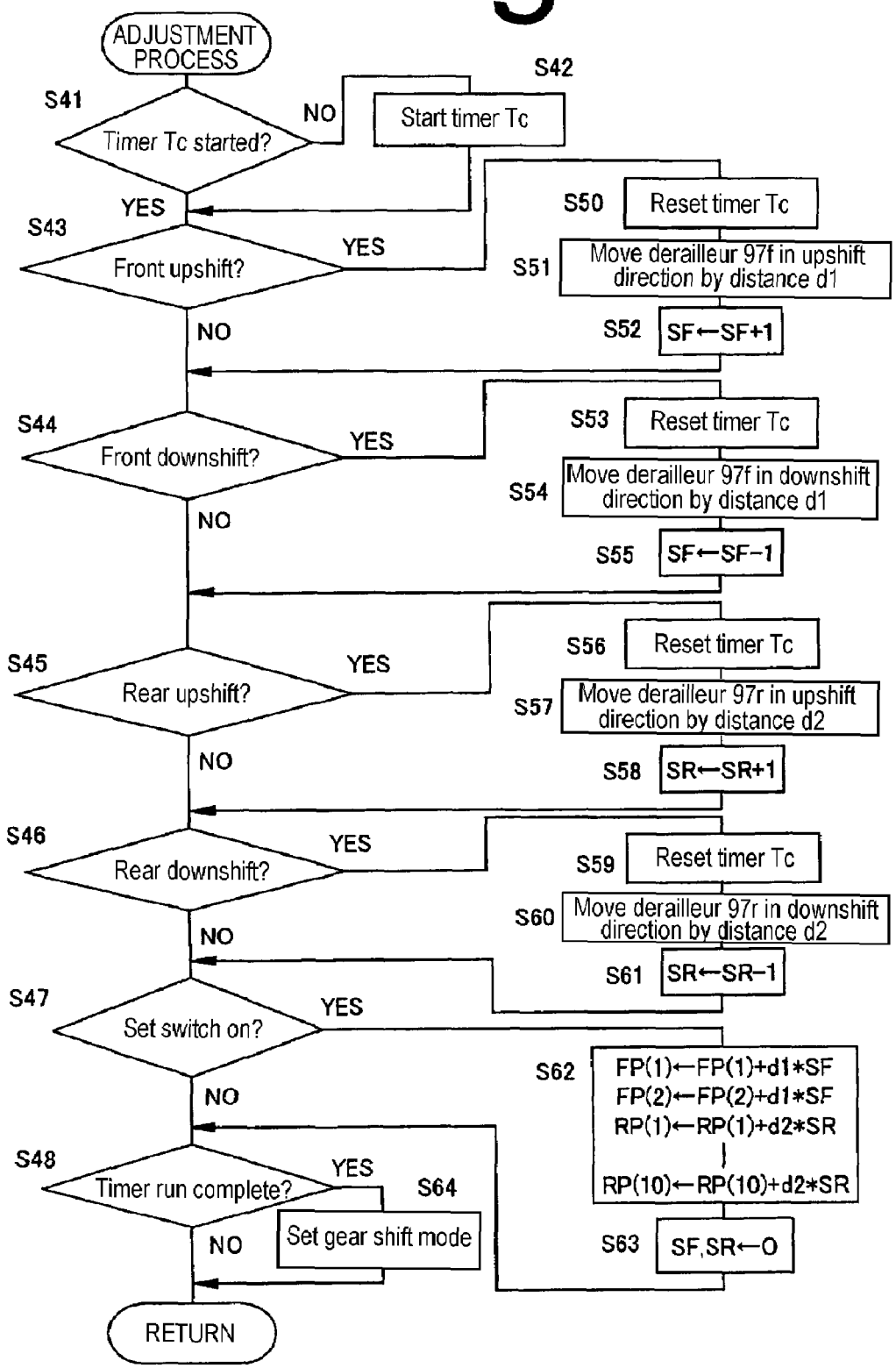
FIG. 11 is a flow chart of a particular embodiment of an adjustment process.

In any event, it is then determined in a step S5 whether or not adjustment mode is set. If so, then an adjustment process shown in FIG. 11 is performed in a step S12. In any event, it is then determined in a step S6 whether other processes have been selected. If so, then such other processes are performed in a step S13. The process then returns to step S2.

FIG. 10 is a flow chart of a particular embodiment of the mode setting process performed in step S10 of FIG. 9. In this mode setting process, it is first determined in a step S21 whether or the mode switch 136 was turned on. If so, it is then determined in a step S24 whether or not control unit 130 currently is in gear shift mode. If so, then control unit 130 outputs a command to change to adjustment mode (adjustment mode command ON) in a step S25. Otherwise, control unit 130 outputs a command to change to gear shift mode (gear shift mode command ON) in a step S25. The net result is a command to switch to an operating mode opposite the current operating mode.

In any event, it is then determined in a step S22 whether or not an adjustment mode command was output by control unit 130 (adjustment mode command ON). If so, it is then determined in a Step S27 whether or not set switch 137 is turned on. If so, then adjustment mode is set in a step S28. At that time, display of the gear shift mode in LCD 135 is switched off and display of the adjustment mode is switched on. Output of the adjustment mode command then stops to complete the mode change operation.

In any event, it is then determined in a step S223 whether or not a gear shift mode command was output by control unit 130 (gear shift mode command ON). If so, it is then determined in a Step S29 whether or not set switch 137 is turned on. If so, then gear shift mode is set in a step S30. At that time, display of the adjustment mode in LCD 135 is switched off and display of the gear shift mode is switched on. Output of the gear shift mode command then stops to complete the mode change operation. The process returns to step S4 in FIG. 9 after completion of all of the above steps.

FIG. 11 is a flow chart of a particular embodiment of the adjustment process performed in step S12 of FIG. 9. In this adjustment process, it is first determined in a step S41 whether or not a timer Tc has already started. Timer Tc measures the time since the last operation of any one of the shift control devices 120f, 120r, 121f or 121r. If none of the shift control devices 120f, 120r, 121f or 121r is operated for a predetermined time period (e.g., 10-20 seconds) when control unit 130 is in adjustment mode, then the operating mode switches back to gear shift mode. If timer Tc has not yet started, then control unit 130 starts timer Tc in step S42.

In any event, it is then determined in step S43 whether or not a front upshift switch 131f has been operated as a result of the operation front shift control device 120f or 121f. If so, then timer Tc is reset in a step S50, front derailleur 97f is moved in the upshift direction (laterally outward) by a small distance d1 (e.g., 0.1 mm-0.3 mm), and a variable SF that is incremented or decremented in response to the operation of front upshift switch 131f or front downshift switch 132f, respectively, is incremented by 1. In any event, it is then determined in a step S44 whether or not a front downshift switch 132f has been operated as a result of the operation front shift control device 120f or 121f. If so, then timer Tc is reset in a step S53, front derailleur 97f is moved in the downshift direction (laterally inward) by distance d1, and variable SF is decremented by 1. The relationship between the distance of movement of front derailleur 97f and the values output from front gear position sensor 133f is stored in advance in storage unit 138 and used for these operations.

In any event, is then determined in step S45 whether or not a rear upshift switch 131r has been operated as a result of the operation front shift control device 120r or 121r. If so, then timer Tc is reset in a step S56, rear derailleur 97r is moved in the upshift direction (laterally outward) by a small distance d2 (e.g., 0.05 mm-0.2 mm), and a variable SR that is incremented or decremented in response to the operation of rear upshift switch 131r or rear downshift switch 132r, respectively, is incremented by 1. In any event, it is then determined in a step S46 whether or not a rear downshift switch 132r has been operated as a result of the operation of rear shift control device 120r or 121r. If so, then timer Tc is reset in a step S59, rear derailleur 97r is moved in the downshift direction (laterally inward) by distance d2, and variable SR is decremented by 1. The relationship between the distance of movement of rear derailleur 97r and the values output from rear gear position sensor 133r is stored in advance in storage unit 138 and used for these operations.

In any event, is then determined in step S47 whether or not set switch 137 has been operated, thus signifying a request by the rider to complete the adjustment operation. If so, both front derailleur operating positions FP(1) and FP(2) are updated by adding an adjustment distance to the original operating positions FP(1) and FP(2), wherein the adjustment distance comprises the product of variable SF and distance d1 (SF×d1). Of course, if variable SF is a positive number, then updating occurs in the upshift direction (net addition), while if variable SF is a negative number, then updating occurs in the downshift direction (net subtraction). Similarly, all of the rear derailleur operating positions RP(1)-RP(10) are updated by adding an adjustment distance to the original operating positions RP(1)-RP(10), wherein the adjustment distance comprises the product of variable SR and distance d2 (SR× d2). Of course, if variable SR is a positive number, then updating occurs in the upshift direction (net addition), while if variable SR is a negative number, then updating occurs in the downshift direction (net subtraction). After the operating positions are updated, then variables SF and SR are reset to 0 in a step S63.

In any event, it is then determined in step S48 whether or not timer Tc has completed its run, thus indicating that none of the shift control devices 120f, 121f, 120r and 121r has been operated for the predetermined time period. If so, then control unit 130 reverts to gear shift mode in a step S64. In other words, the system automatically returns to gear shift mode in case the rider forgets to manually return to gear shift mode. In any event, processing then returns to step S6 in FIG. 9.

Figure 12:
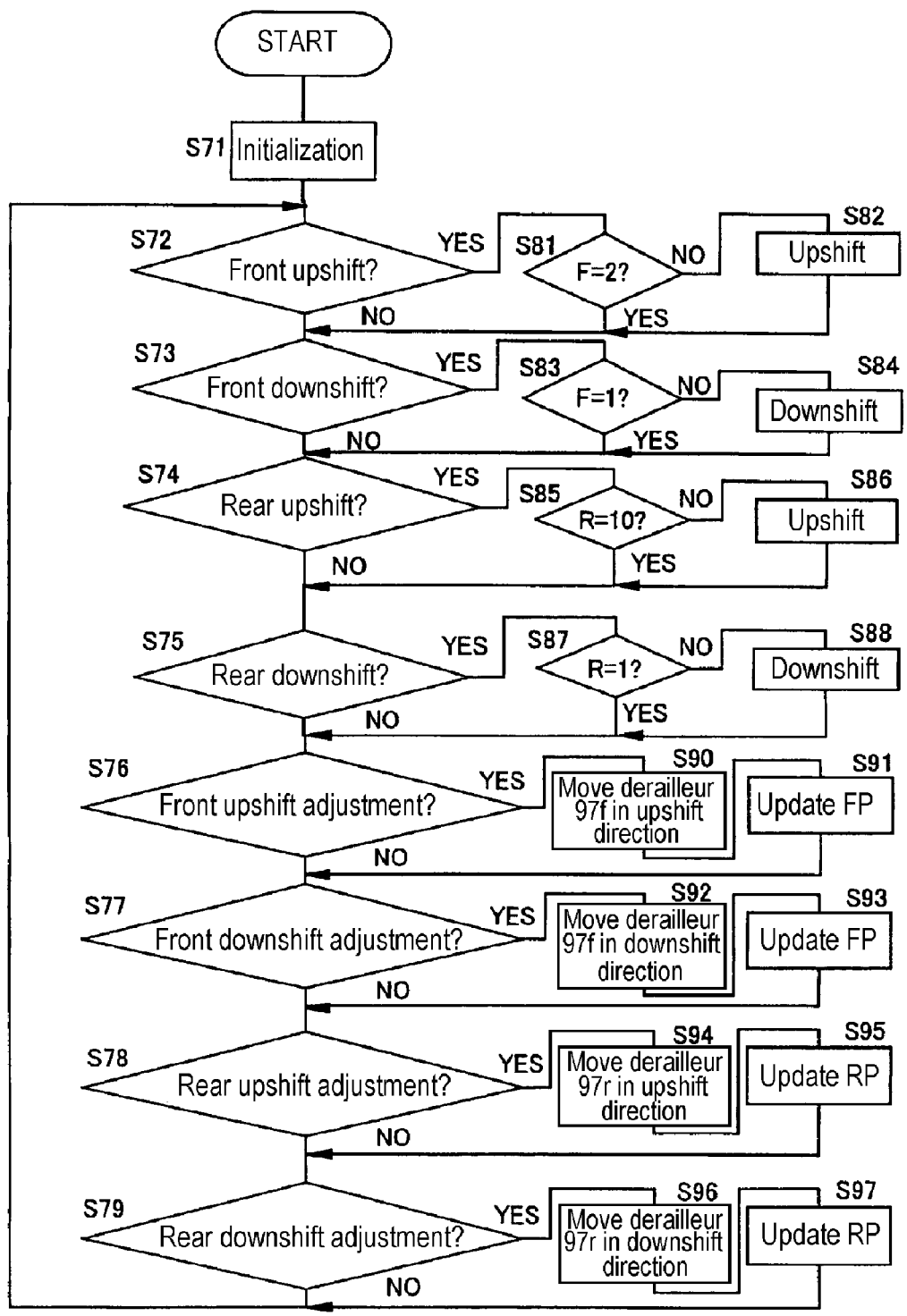
FIG. 12 is a flow chart of another embodiment of the operation of the derailleur control apparatus.

FIG. 12 is a flow chart of another embodiment of the operation of control unit 130. In the first embodiment, operating position adjustments were performed by changing the operating mode from a normal mode to an adjustment mode, but such adjustments may be performed using dedicated adjustment switches. For example, shift control devices 121*f* and 121*r* may be used for gear shifting, and shift control devices 120*f* and 120*r* may be used for adjusting the operating positions of front and rear derailleurs 97*f* and 97*r*, respectively, in which case control devices 121*f* and 121*r* may be considered to be adjustment control devices. Alternatively, separate dedicated adjustment control units may be used.

As shown in FIG. 12, initialization is carried out in a step S71. It is then determined in a step S72 whether or not a front upshift has been requested by the operation of shift control device 121*f*. If so, it is then determined in a step S81 whether or not front derailleur 97*f* is at the operating position for front sprocket F2. If so, then no further upshifting is possible, the upshift request is ignored, and processing continues in step S73. Otherwise, upshifting is performed in a step S82, and processing continues in step S73. It is then determined in step S73 whether or not a front downshift has been requested by the operation of shift control device 121*f*. If so, it is then determined in a step S83 whether or not front derailleur 97*f* is at the operating position for front sprocket F1. If so, then no further downshifting is possible, the downshift request is ignored, and processing continues in step S74. Otherwise, downshifting is performed in a step S84, and processing continues in step S74.

It is then determined in a step S74 whether or not a rear upshift has been requested by the operation of shift control device 121*r*. If so, it is then determined in a step S85 whether or not rear derailleur 97*r* is at the operating position for rear sprocket R10. If so, then no further upshifting is possible, the upshift request is ignored, and processing continues in step S75. Otherwise, upshifting is performed in a step S86, and processing continues in step S75. It is then determined in step S75 whether or not a rear downshift has been requested by the operation of shift control device 121*r*. If so, it is then determined in a step S87 whether or not rear derailleur 97*r* is at the operating position for rear sprocket R1. If so, then no further downshifting is possible, the downshift request is ignored, and processing continues in step S76. Otherwise, downshifting is performed in a step S88, and processing continues in step S76.

It is then determined in a step S76 whether or not adjustment of front derailleur 97*f* in the upshift direction has been requested by the operation of adjustment control device 120*f*. If so, then front derailleur 97*f* is moved in the upshift direction by the desired upshift adjustment distance (e.g., based on the length of time of operation of adjustment control device 120*f*) in a step S90, and the front operating positions FP are updated in a step S91 using the adjustment distance. It is then determined in a step S77 whether or not adjustment of front derailleur 97*f* in the downshift direction has been requested by the operation of adjustment control device 120*f*. If so, then front derailleur 97*f* is moved in the downshift direction by the desired downshift adjustment distance in a step S92, and the front operating positions FP are updated in a step S93 using the adjustment distance. While all of the operating positions for front derailleur 97*f* may be updated in one step, it is possible to update the specific position being adjusted in one step and then adjust the remaining positions in a following step.

It is then determined in a step S78 whether or not adjustment of rear derailleur 97*r* in the upshift direction has been requested by the operation of adjustment control device 120*r*. If so, then rear derailleur 97*r* is moved in the upshift direction by the desired upshift adjustment distance (e.g., based on the length of time of operation of adjustment control device 120*r*) in a step S94, and the rear operating positions RP are updated in a step S95 using the adjustment distance. It is then determined in a step S79 whether or not adjustment of rear derailleur 97*r* in the downshift direction has been requested by the operation of adjustment control device 120*r*. If so, then rear derailleur 97*r* is moved in the downshift direction by the desired downshift adjustment distance in a step S96, and the rear operating positions RP are updated in a step S97 using the adjustment distance. While all of the operating positions for rear derailleur 97*r* may be updated in one step, it is possible to update the specific position being adjusted in one step and then adjust the remaining positions in a following step.

Figure 13:
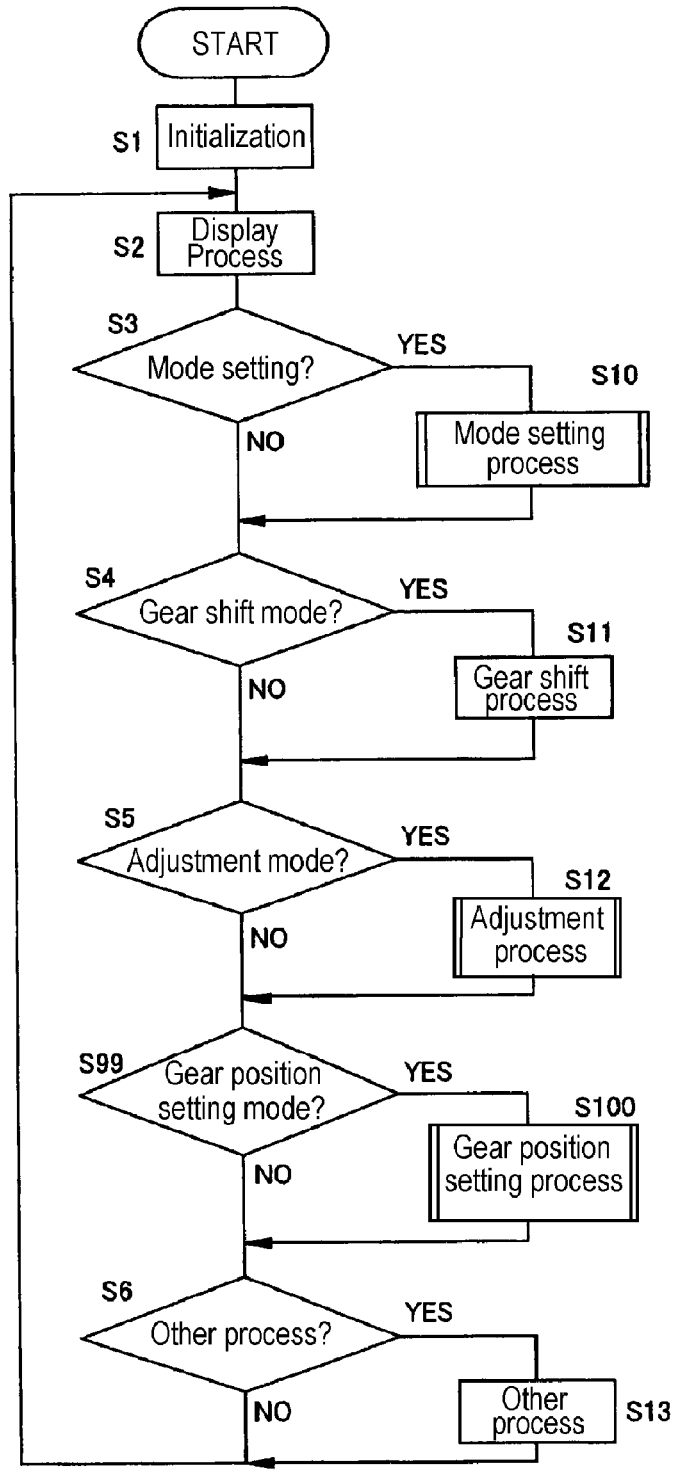
FIG. 13 is a flow chart of another embodiment of the operation of the derailleur control apparatus.
Figure 14:
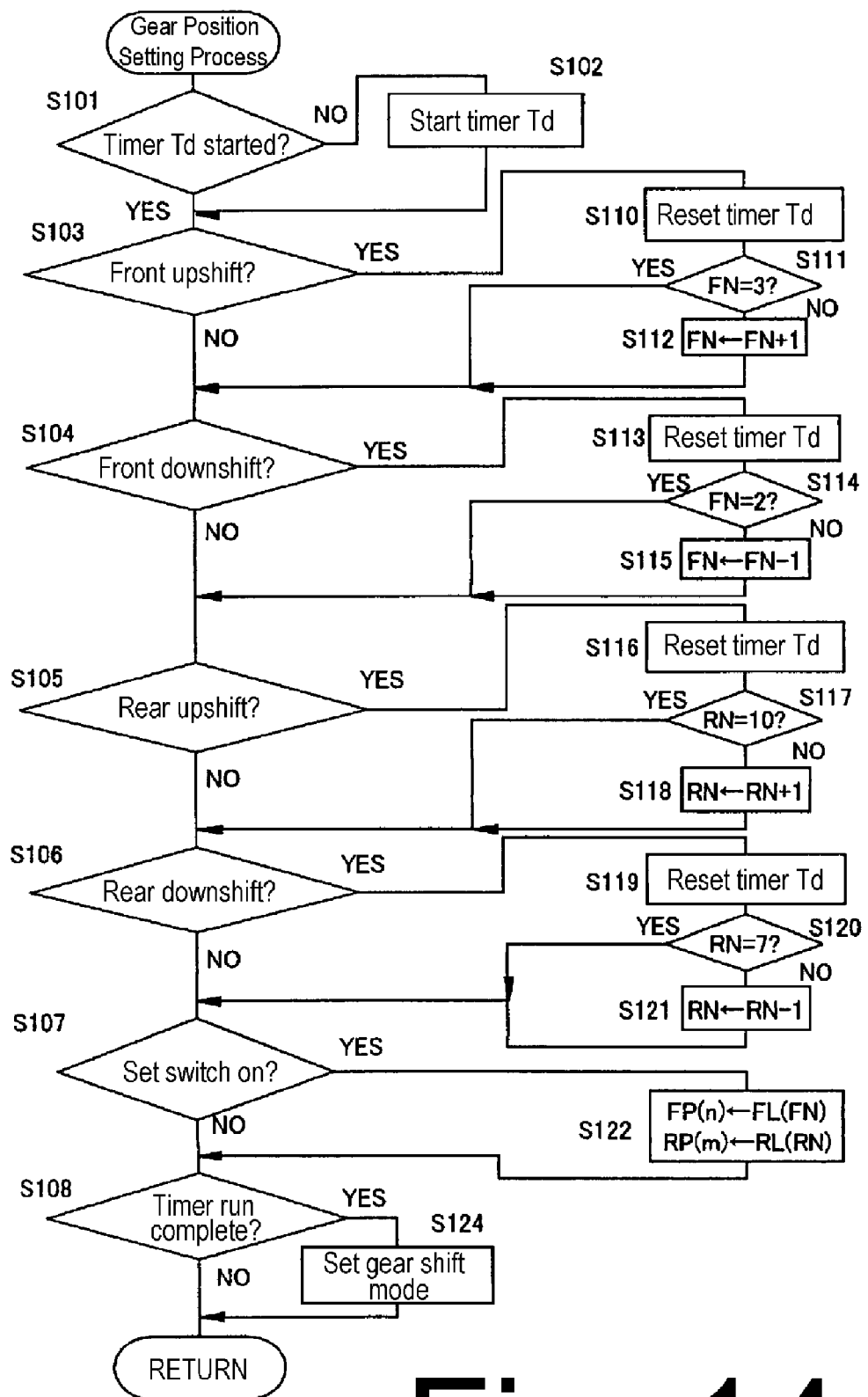
FIG. 14 is a flow chart of a particular embodiment of an adjustment process used in the embodiment shown in FIG. 13.

FIGS. 13 and 14 are flow charts of another embodiment of the operation of control unit 130. In this embodiment, it is possible to specify the number of front and rear sprockets 99*f* and 99*r* and then automatically set the operating position for each sprocket. To accomplish this additional function, a step S99 is inserted between step S5 and step S6 in FIG. 9 to produce the flow chart shown in FIG. 13. In step S99, it is determined whether or not the current mode is a gear position setting mode. The gear position setting mode may be set via the mode setting process shown in FIG. 10, for example. In this case, it is possible to have the gear shift mode, the adjustment mode, the gear position setting mode and any other available modes alternate in a cyclical fashion upon each operation of mode switch 136, and then set switch 137 may be operated to set the desired mode. If it is determined in step S99 that gear position setting mode has been set, then a gear position setting process is performed in a step S100.

FIG. 14 is a flow chart of a particular embodiment of the gear setting process of step S100. Basically, the number of front sprockets 99*f* is set by operating shift control device 120*f* or 121*f*, and the number of rear sprockets 99*r* is set by operating shift control device 120*r* or 121*r*. The number is increased when the corresponding shift control device is operated in the upshift direction, and the number is decreased when the corresponding shift control device is operated in the downshift direction. Once the proper numbers are selected, they are set using set switch 137, whereupon the operating positions for all of the sprockets are set automatically.

It is first determined in a step S101 whether or not a timer Td has already started. Timer Td is used to revert control unit 130 to gear shift mode when none of the shift control devices 120*f*, 120*r*, 121*f* and 121*r* has been operated for a predetermined time period (e.g., 10-20 seconds) when control unit 130 is in the gear position setting mode. If timer Td has not yet started, then timer Td is started in a step S102. In any event, it is then determined in a step S103 whether or not front a upshift switch 131*f* has been operated by the operation of shift control device 120*f* or 121*f* to increment the number of front sprockets. If so, then timer Td is reset in a step S110, and it is then determined in a step S111 whether or not a current cumulative total FN for the number of front sprockets is equal to 3. This determination is made to limit the maximum number of front sprockets to 3, since the number of front sprockets 99*f* in this embodiment is either 2 or 3. Thus, if FN is equal to 3, the request is ignored, and processing continues in step S104. If FN is not equal to 3, then FN is incremented by one in a step S112. In any event, it is then determined in a step S104 whether or not a front downshift switch 132*f* has been operated by the operation of shift control device 120*f* or 121*f* to decrement the number of front sprockets. If so, then timer Td is reset in a step S113, and it is then determined in a step S111 whether or not FN is equal to 2. This determination is made to limit the minimum number of front sprockets to 2. Thus, if FN is equal to 2, the request is ignored, and processing continues in step S105. If FN is not equal to 2, then FN is decremented by one in a step S115.

In any event, it is then determined in step S105 whether or not rear upshift switch 131r has been operated by the operation of shift control device 120r or 121r to increment the number of rear sprockets. If so, then timer Td is reset in a step S116, and it is then determined in a step S117 whether or not a current cumulative total RN for the number of rear sprockets is equal to 10. This determination is made to limit the maximum number of rear sprockets to 10, since the normal number of rear sprockets 99r in this embodiment is from 7 to 10. Thus, if RN is equal to 10, the request is ignored, and processing continues in step S106. If RN is not equal to 10, then RN is incremented by one in a step S118. In any event, it is then determined in step S106 whether or not rear a downshift switch 132r has been operated by the operation of shift control device 120r or 121r to decrement the number of rear sprockets. If so, then timer Td is reset in a step S119, and it is then determined in a step S120 whether or not RN is equal to 7. This determination is made to limit the minimum number of rear sprockets to 7. Thus, if RN is equal to 7, the request is ignored, and processing continues in step S107. If RN is not equal to 7, then RN is decremented by one in a step S121.

The rider indicates the completion of the number input operation by operating set switch 137. Accordingly, it is determined in step S107 whether or not set switch 137 has been operated. If so, then the operating positions FP(n) (where (n) is a positive integer from 1 to FN) of front derailleur 97f for the FN sprockets is updated to the operating positions FL (FN) stored in memory 138 for that number FN of sprockets 99f. At the same time, the operating positions RP(m) (where (m) is a positive integer from 1 to RN) of rear derailleur 97r for the RN sprockets is updated to the operating positions RL (RN) stored in memory 138 for that number RN of rear sprockets 99r.

In any event, it is then determined in step S108 whether or not timer Td has completed its run, thus indicating that none of the shift control devices 120f, 121f, 120r and 121r has been operated for the predetermined time period. If so, then control unit 130 reverts to gear shift mode in a step S124. In other words, the system automatically returns to gear shift mode in case the rider forgets to manually return to gear shift mode. In any event, processing then returns to step S6 in FIG. 13.

While the above is a description of various embodiments of inventive features, further modifications may be employed without departing from the spirit and scope of the present invention. For example, in the described embodiments, the operating mode was switched via operation of mode switch 136, but the operating mode may be switched using dedicated operating mode switches, one per operating mode. While, the adjustment distance was changed based on the number of times that a shift control device 120f, 120r, 121f or 121r was operated during adjustment mode processing, the adjustment distance may be changed based on the amount of time that the shift control device 120f, 120r, 121f or 121r operates. Additionally, while alternation between the gear shift mode and the adjustment mode was carried out using a dedicated mode switch 136, mode switching may be accomplished by operating one of the shift control devices 120f, 120r, 121f or 121r for a minimum predetermined time period (e.g., two seconds). While the described embodiments were applied to a road bicycle, the bicycle may have any configuration.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. An apparatus for adjusting positions of a bicycle control device that moves to a plurality of operating positions, wherein the apparatus comprises:
   a memory for storing a plurality of operating position values corresponding to the plurality of operating positions;
   an adjustment value providing unit that provides an adjustment value; and
   an updating unit;
   wherein the updating unit provides a first updated operating position value from a first operating position value based on the adjustment value; and
   wherein the updating unit provides a second updated operating position value from a different second operating position value based on the adjustment value.

2. The apparatus according to claim 1 wherein the adjustment value is not one of the plurality of operating position values.

3. The apparatus according to claim 1 wherein the plurality of operating position values correspond to a plurality of derailleur positions.

4. The apparatus according to claim 1 wherein the updating unit stores the first updated operating position value and the second updated operating position value in the memory.

5. The apparatus according to claim 1 wherein the updating unit provides updated operating position values for all of the plurality of operating position values based on the adjustment value used to provide the first updated operating position value.

6. The apparatus according to claim 5 wherein the updating unit stores all of the updated operating position values in the memory.

7. The apparatus according to claim 1 wherein the adjustment value providing unit comprises a position setting unit for the bicycle control device.

8. The apparatus according to claim 7 wherein the adjustment value providing unit is mounted to a brake lever assembly.

9. The apparatus according to claim 7 wherein the adjustment value comprises an adjustment movement value.

10. The apparatus according to claim 7 wherein the adjustment value providing unit comprises a manually operated electrical switch.

11. The apparatus according to claim 10 wherein the adjustment value comprises an adjustment movement value, and wherein the adjustment value is incremented upon operation of the switch.

12. The apparatus according to claim 11 wherein the adjustment value is incremented upon each of a plurality of operations of the switch.

13. The apparatus according to claim 11 wherein the adjustment value is incremented based on a length of a time period of operation of the switch.

14. The apparatus according to claim 11 wherein the plurality of operating position values correspond to a plurality of derailleur positions, and wherein the adjustment movement value corresponds to an adjustment movement of the derailleur.

15. The apparatus according to claim 14 further comprising:
at least one of an upshift switch and a downshift switch for the derailleur; and
a gear shift controller;
wherein the gear shift controller moves the derailleur to one of the plurality of operating positions in an upshift direction in response to operation of the upshift switch; and
wherein the gear shift controller moves the derailleur to one of the plurality of operating positions in a downshift direction in response to operation of the downshift switch.

16. The apparatus according to claim 14 wherein the switch comprises
an operating member;
an upshift switch; and
a downshift switch;
wherein the operating member moves from a neutral position to an upshift position to operate the upshift switch; and
wherein the operating member moves from the neutral position to a downshift position to operate the downshift switch.

17. The apparatus according to claim 16 wherein the adjustment movement value corresponds to an adjustment movement of the derailleur in an upshift direction when the switch moves from the neutral position to the upshift position, and wherein the adjustment movement value corresponds to an adjustment movement of the derailleur in a downshift direction when the switch moves from the neutral position to the downshift position.

18. The apparatus according to claim 1 further comprising an operating mode setting unit, wherein the operating mode setting unit sets the apparatus into a normal mode in which the bicycle control device is controlled to move to selected ones of the plurality of operating positions, and wherein the operating mode setting unit sets the apparatus into an adjustment mode in which the bicycle control device is controlled to move a distance less than a distance between first and second operating positions.

19. The apparatus according to claim 18 wherein the plurality of operating position values correspond to a plurality of derailleur positions, wherein the adjustment value providing unit further comprises at least one of an upshift switch and a downshift switch for a derailleur, and further comprising:
a gear shift controller; and
an adjustment controller;
wherein, when the apparatus is in the normal mode:
the gear shift controller moves the derailleur to one of the plurality of derailleur positions in an upshift direction in response to operation of the upshift switch; and
the gear shift controller moves the derailleur to one of the plurality of derailleur positions in a downshift direction in response to operation of the downshift switch; and
wherein, when the apparatus is in the adjustment mode:
the adjustment controller moves the derailleur an adjustment distance in an upshift direction in response to operation of the upshift switch; and
the adjustment controller moves the derailleur an adjustment distance in a downshift direction in response to operation of the downshift switch.

20. The apparatus according to claim 19 wherein, when the at least one of the upshift switch and the downshift switch is operated for a first time interval, the operating mode setting unit switches the apparatus from one of the normal mode and the adjustment mode to the other one of the normal mode and the adjustment mode.

21. The apparatus according to claim 20 wherein the operating mode setting unit sets the apparatus to the normal mode when the at least one of the upshift switch and the downshift switch is not operated during a second time interval.

22. The apparatus according to claim 19 wherein the operating mode setting unit comprises a mode switch separate from the at least one of the upshift switch and the downshift switch to set the apparatus to the normal mode and to the adjustment mode.

23. The apparatus according to claim 22 wherein the operating mode setting unit sets the apparatus to the normal mode when the mode switch is not operated during a time interval.

24. The apparatus according to claim 1 further comprising:
a number indicating unit that indicates a number of the plurality of operating positions; and
wherein the updating unit stores in the memory an operating position value for each of the plurality of operating positions in response to the number indicating unit.

25. The apparatus according to claim 1 wherein the updating unit automatically provides an updated operating position value for each of plurality of operating position values.

26. The apparatus according to claim 1 wherein the updating unit provides the first updated operating position value and the second updated operating position value by performing a mathematical operation on the corresponding first operating position value and second operating position value with a same value.

27. The apparatus according to claim 26 wherein the updating unit provides the first updated operating position value and the second updated operating position value by adding or subtracting the same value to the first operating position value and to the second operating position value.

28. The apparatus according to claim 27 wherein the updating unit automatically provides an updated operating position value for each of plurality of operating position values by adding or subtracting the same value to each of the plurality of operating position values.

* * * * *